Patented Feb. 13, 1940

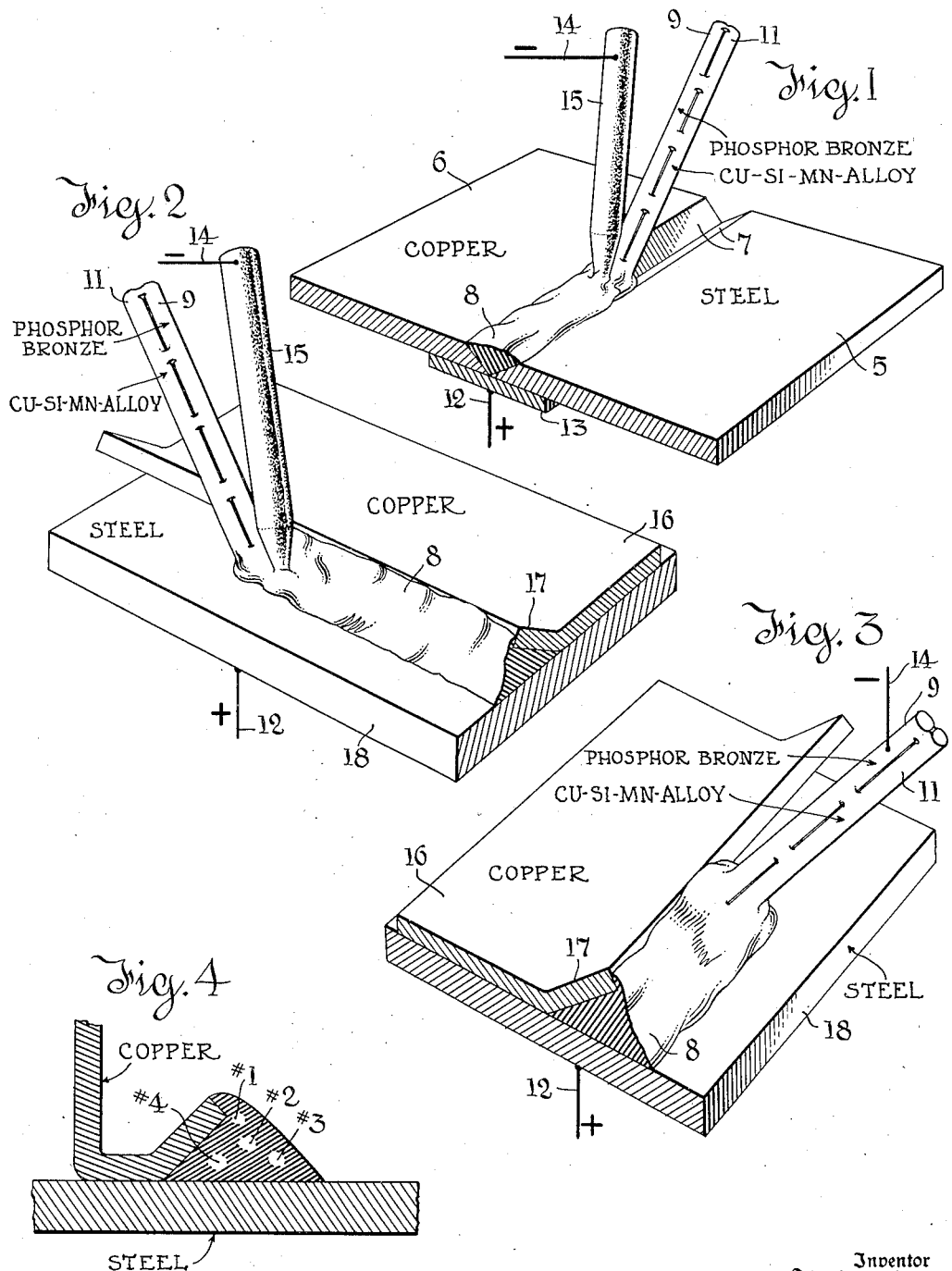

2,190,267

UNITED STATES PATENT OFFICE 2,190,267

METHOD OF MAKING A WELDED JOINT

Albert T. Light, York, Pa., assignor to York Ice Machinery Corporation, York, Pa., a corporation of Delaware Application March 9, 1938, Serial No. 194,918

2 Claims. (Cl. 113—112)

This invention relates to methods of making welded joints, and more particularly to joints in which the two components are copper and steel.

Welded joints between copper and steel are known and have been satisfactory for structural purposes. An effective and satisfactory weld union between copper and steel for gas tight joints subject to pressure has, however, not been possible according to prior art methods. The principal difficulty is that welding materials which join well to copper do not join well to steel, and vice versa. Whether or not the explanation for this phenomenon may lie in the different points which the two metals occupy in the electro-chemical series, the fact remains that a highly satisfactory welded union of these two metals for gas tight pressure joints, and one capable of commercial production is not available in the prior art.

The basis of the present invention directed to this problem consists in the use of a system of welding in which two synthetic welding rods of different compositions are used, one of them being of a material which has a greater affinity for steel than for copper, and the second one being of a material having a greater affinity for copper than for steel, but the two materials having a substantial affinity for each other. During the welding operation, the material of each of the two rods fuses and bonds to its associated metal of the two metals to be joined, and then the two fused masses alloy together to complete the joint. In this way it becomes possible to have the weld material form a strong intimate union with both the steel and the copper, the material of the finished weld differing in composition from that of each of the welding rods employed, but being substantially homogeneous in structure.

The present invention is, therefore, concerned with a pressure-tight welded joint, and a method of making it so as to ensure a strong, permanent union between steel and copper, making use of materials and apparatus which are readily available for utilization.

In the drawing:

Figure 1 is a diagrammatic view of a butt-joint in the process of being welded by a preferred method embodying the present invention;

Fig. 2 is a view similar to Fig. 1 but illustrating a lap joint;

Fig. 3 is a modification of Fig. 2 showing the use of a twin welding rod as in Figs. 1 and 2, but using this rod as a welding electrode;

Fig. 4 is a sectional view, partly diagrammatic, illustrating the character of the weld produced by methods embodying the invention.

In Fig. 1, reference character 5 designates a steel member and 6 a copper member in the process of being butt welded together by a method embodying the present invention. As is usual in forming butt-joints of this character, it is preferred that the joining edges of the members 5 and 6 be cut away as at 7 to form a more or less V-shaped groove in which the molten weld material 8 may flow. Associated with the joint during the welding operation are two welding rods 9 and 11, joined together for convenience of manipulation as a unit by spot welding, brazing, soldering, or the like, to form a twin unit. It is even possible that these two rods might be drawn out together as a single unit provided the distinct composition of each of the alloys be maintained separate from that of the other throughout the length of the twin rod, however the preferred method is that shown. The rod 9, which cooperates with the copper member 6, is composed of an alloy having a greater affinity for copper than for steel and capable of forming an effective union with copper. Although reasonable variations in percentage composition of this alloy are feasible, so long as the affinity of the alloy for copper is maintained with concurrent ability to mingle effectively with the other alloy, it is preferred to use an alloy known as phosphor-bronze, and having the approximate composition of copper 89.2%, tin 10.5% and phosphorus 0.30%. This particular composition forms a good union with the copper and with the other welding rod, but does not form a good union with steel.

The welding rod 11 consists of an alloy having a greater affinity for steel than for copper and, therefore, capable of forming a good union with the steel. It must also form a strong union with the material of the rod 9. While the composition of this alloy rod may also vary within reasonable limits, consistent with good welding to steel and ability to mingle with the phosphor-bronze, I prefer to use an alloy known as silicon bronze and by the trade name of "Everdur," having the approximate composition of 96% copper, 3% silicon, and 1% manganese. The rod 11 cooperates with the steel member 5 during the welding operation.

While for convenience of operation and in practice it is preferred to join the two welding rods so that they may be handled as a unitary twin rod, it is entirely possible to use them without physically joining them together. Either method makes it possible to preserve a distinct separation between the fused material of one rod and that of the other until a satisfactory weld is formed between each material, and the member with which it is to join and before the two alloys intermingle in the finished joint.

While various arrangements of the welding circuit are possible in order to bring the ends of rods 9 and 11 to welding temperature and to form a satisfactory joint and in practice electrical means are preferred, the heat need not be applied electrically, but gas heat and other equivalent heating means may be utilized. One suitable and preferred method is electrical as indicated in Fig. 1 in which the positive terminal 12 of any suitable source of direct current is electrically connected to the work through a backing plate 13, and the negative terminal 14 of the source is connected to a carbon electrode 15, held in such position with respect to the joint and the positive terminal 12 as to form an arc discharge over the area where the welding rods 9 and 11 contact with the work. In this manner, the ends of the rods 9 and 11 are fused, the rod 9 having a melting point of approximately 1850° F. and the rod 11 having a melting point of approximately 1875° F. As the ends of these rods melt, the alloys form unions, probably in the form of thin films, with the metal members 6 and 5 with which they are associated, and then the two portions of molten alloy flow and mingle together within the V-shaped recess at the joint 7 to form a third alloy which constitutes the weld 8. When the weld is complete the electrode 15 and the rods 9 and 11 are moved along the seam so as to produce a continuous welded joint. It is essential in producing a good joint that intermingling of the two alloys be prevented until each has joined to its associated member of the joint.

The process just described may be applied in a similar manner to a lap joint of the type shown in Fig. 2 in which the positive and negative terminals of the source are connected as before, but the copper member 16 has its end upturned at 17 with respect to the steel member 18, so as to provide a clearance space into which the molten metal may flow to form the joint. As before, the welding rod unit composed of rods 9 and 11 is brought into the heated area in the vicinity of the joint between the steel and the copper, and the heating is continued until the molten materials from the two rods adhere to their associated members and then intermingle and alloy together in the space beneath the upturned end 17 of copper member 16. The material 8 consisting of an alloy of the rods 9 and 11, forms a sound, substantially homogeneous, unit effectively joined to both the steel and copper, but incapable of welding to either of them except by a procedure such as set forth herein.

The modification shown in Fig. 3 is similar to that of Fig. 2, except that here the carbon electrode is omitted and the negative terminal 14 of the source of welding current connected to the twin rod. This arrangement is possible and avoids the use of two separate welding elements.

As indicated above, the material 8 of the finished joint is of substantially homogeneous character and of practically uniform chemical composition throughout. The weld material composition, however, differs materially from that of either of the welding rods 9 and 11. The section of Fig. 4 shows a joint made according to the method of Fig. 2 from which two sets of analyses of the weld material were made substantially at the points designated #1, #2, #3, and #4. The following Tables A and B indicate the results of those analyses made with a twin welding rod composed of a silicon bronze rod and a phosphor-bronze rod of the following compositions:

PHOSPHOR-BRONZE

|  | Per cent |
|---|---|
| Copper | 89.2 |
| Tin | 10.5 |
| Phosphorus | .3 |
| Total | 100.0 |

SILICON BRONZE (EVERDUR)

|  | Per cent |
|---|---|
| Copper | 96 |
| Silicon | 3 |
| Manganese | 1 |
| Total | 100 |

Table A

|  | #1 | #2 | #3 | #4 |
|---|---|---|---|---|
|  | Percent | Percent | Percent | Percent |
| Copper | 92.97 | 92.37 | 92.70 | 93.78 |
| Tin | 3.87 | 3.60 | 3.81 | 3.01 |
| Phosphorus | .08 | .09 | .09 | .06 |
| Manganese | .26 | .27 | .34 | .24 |
| Silicon | .49 | .90 | .91 | 1.64 |
| Iron and other impurities (by diff.) | 2.33 | 2.77 | 2.15 | 1.27 |
| Total | 100.00 | 100.00 | 100.00 | 100.00 |

Table B

|  | #1 | #2 | #3 | #4 |
|---|---|---|---|---|
|  | Percent | Percent | Percent | Percent |
| Copper | 92.05 | 92.12 | 92.59 | 92.48 |
| Tin | 3.19 | 3.45 | 3.82 | 3.90 |
| Phosphorus | .08 | .09 | .10 | .09 |
| Manganese | .22 | .36 | .36 | .29 |
| Silicon | 1.01 | .93 | 1.00 | 1.00 |
| Iron and other impurities (by diff.) | 3.45 | 3.05 | 2.13 | 2.24 |
| Total | 100.00 | 100.00 | 100.00 | 100.00 |

The above analyses show that the weld contains substantial quantities of all the metals composing the welding rods, the average composition of the weld computed from all values of Tables A and B being as follows:

|  | Per cent |
|---|---|
| Copper | 92.63 |
| Tin | 3.58 |
| Phosphorus | 0.08 |
| Manganese | 0.28 |
| Silicon | 0.98 |
| Iron and other impurities | 2.42 |

It is interesting to note that while the silicon bronze rod contains 96 percent copper and the phosphor-bronze rod contains 89.2 percent copper, a mixture of equal parts of the two rods would contain an average of 92.6 percent copper. This average is very closely approximated in the analysis of the weld which shows an average of 92.63 percent copper.

A welded joint produced in accordance with the present invention is strong and compact and effectively joins the two materials in spite of their diversity of characteristics and electro-chemical behavior. The welding operation may be carried out rapidly by causing the welding rods and the welding electrode 12 to move along the joint as fast as it is completed, and without any of the usual difficulties which are present when two materials of such diverse characteristics are to be joined.

Extensive use of condensers having copper headers attached to a steel shell by the present method, and where the joint is subject to pressure, has met the severe tests of commercial use without the deterioration which is characteristic of prior art structures. Although this joint and the method of making it are of general application, they are particularly suited for use in making welded joints in condensers of the type disclosed and claimed in the copending application of John G. Bergdoll, Serial No. 93,695, filed July 31, 1936, and assigned to the York Ice Machinery Corporation.

Although the present description illustrates several types of joint and but one method of supplying heat to that joint, it is obvious that no limitations are to be implied since the method may find application wherever steel and copper members are to be permanently joined by a welded connection and whether the heat be applied by electrical or other means known to the art of welding.

What is claimed is:

1. The method of producing a gas-tight union between abutting steel and copper members which consists in bringing an alloy welding rod having an approximate composition of 96% copper, 3% silicon and 1% manganese into operative relation with the steel member, bringing an alloy welding rod having an approximate composition of 89.2% copper, 0.30% phosphorus and 10.5% tin into operative relation with the copper member, applying heat to the alloys and the members in the region where the weld is to be formed until each alloy fuses and forms a film on its particular member, and then causing the alloys to flow together and form a substantially homogeneous weld between the two members.

2. The method of producing a gas-tight welded union between steel and copper members which comprises bringing said members into juxtaposition, supplying heat to a localized area where said members are to be joined, bringing a welding rod having an approximate composition of 96% copper, 3% silicon, and 1% manganese into operative relation with the steel member within the heated area, bringing an alloy welding rod having an approximate composition of 89.2% copper, 0.30% phosphorus and 10.5% tin into operative relation with the copper member within the heated area, continuing the application of heat until both of said alloys are fused, manipulating the welding means and the members to produce a film of molten metal on each of said members by its associated alloy, but without intermingling of said alloys, and then causing the molten alloys to intermingle in the heated area to form a pressure tight welded joint between the members.

ALBERT T. LIGHT.